United States Patent
Manhart

(10) Patent No.: US 12,548,224 B2
(45) Date of Patent: Feb. 10, 2026

(54) ARTIFACT AND/OR MOVEMENT CORRECTION IN MEDICAL IMAGES

(71) Applicant: Siemens Healthcare GmbH, Erlangen (DE)

(72) Inventor: Michael Manhart, Fürth (DE)

(73) Assignee: Siemens Healthineers AG, Forchheim (DE)

( * ) Notice: Subject to any disclaimer, the term of this patent is extended or adjusted under 35 U.S.C. 154(b) by 481 days.

(21) Appl. No.: 18/100,948

(22) Filed: Jan. 24, 2023

(65) Prior Publication Data

US 2023/0237716 A1 Jul. 27, 2023

(30) Foreign Application Priority Data

Jan. 25, 2022 (DE) ...................... 10 2022 200 806.5

(51) Int. Cl.
G06T 11/00 (2006.01)

(52) U.S. Cl.
CPC .......... *G06T 11/008* (2013.01); *G06T 11/005* (2013.01); *G06T 2210/41* (2013.01); *G06T 2211/436* (2013.01)

(58) Field of Classification Search
CPC . G06T 2207/10116; G06T 2207/10081; G06T 2207/10072; G06T 2211/40;
(Continued)

(56) References Cited

U.S. PATENT DOCUMENTS

2002/0181649 A1\* 12/2002 Rasche ................ A61B 6/0487
378/21
2003/0014034 A1\* 1/2003 Strobel ................. A61B 6/504
604/407
(Continued)

FOREIGN PATENT DOCUMENTS

CN       1865954 A      11/2006
CN     105979238 A       9/2016
(Continued)

OTHER PUBLICATIONS

Frysch et al., Rigid Motion Compensation in Interventional C-arm CT Using Consistency Measure on Projection Data. In: Navab, N., Hornegger, J., Wells, W., Frangi, A. (eds) Medical Image Computing and Computer-Assisted Intervention, MICCAI 2015, Lecture Notes in Computer Science, vol. 9349, furnished via IDS.\*
(Continued)

*Primary Examiner* — Guillermo M Rivera-Martinez
(74) *Attorney, Agent, or Firm* — Lempia Summerfield Katz LLC

(57) ABSTRACT

A computer-implemented method includes where at least one projection mapping pair of an object under examination by a medical biplane imaging device is acquired. The at least one projection mapping pair contains a first and a second projection mapping of the object under examination, that map the object under examination simultaneously in a first and a second detection plane. The first and second detection planes are arranged non-parallel to one another. A correction model for the correction of an artifact and/or a movement is determined. The artifact or the movement is mapped simultaneously in the at least one first and the at least one second projection mapping. The at least one projection mapping pair specifies a consistency condition for the determination of the correction model. The result dataset is reconstructed at least from the at least one first projection mapping and on the basis of the correction model.

15 Claims, 4 Drawing Sheets

(58) Field of Classification Search
CPC .. G06T 2211/00; G06T 11/003; G06T 11/008; G06T 11/005; G06T 2210/41; G06T 2211/436; G06V 10/10
See application file for complete search history.

(56) References Cited

U.S. PATENT DOCUMENTS

| | | | | |
|---|---|---|---|---|
| 2003/0052879 | A1* | 3/2003 | Barth | G06T 11/005 345/420 |
| 2006/0018426 | A1* | 1/2006 | Bruder | A61B 6/032 378/19 |
| 2010/0296623 | A1* | 11/2010 | Mielekamp | G06T 19/20 378/98.2 |
| 2012/0069950 | A1* | 3/2012 | Grasruck | A61B 6/4021 378/4 |
| 2013/0315459 | A1 | 11/2013 | Wollenweber et al. | |
| 2015/0216498 | A1* | 8/2015 | Schulze | A61B 6/584 378/207 |
| 2015/0346121 | A1* | 12/2015 | Giencke | G01B 9/02018 378/74 |
| 2018/0192985 | A1* | 7/2018 | Maass | A61B 6/032 |
| 2018/0268574 | A1* | 9/2018 | Lilja | G06T 11/006 |
| 2019/0192101 | A1* | 6/2019 | Manhart | A61B 6/032 |
| 2019/0378329 | A1* | 12/2019 | Kiely | A61B 5/7292 |
| 2020/0193656 | A1* | 6/2020 | Schoendube | A61B 6/4085 |
| 2020/0222018 | A1* | 7/2020 | van Walsum | A61B 6/5264 |
| 2020/0237330 | A1* | 7/2020 | Birkhold | A61B 6/481 |
| 2020/0286264 | A1* | 9/2020 | Kaethner | G06T 11/005 |
| 2020/0302660 | A1* | 9/2020 | König | G06T 11/006 |
| 2020/0375554 | A1* | 12/2020 | Ergler | A61B 6/06 |
| 2021/0345943 | A1* | 11/2021 | Nakaya | A61B 6/4233 |
| 2023/0148983 | A1* | 5/2023 | Shechter | A61B 6/4441 378/4 |

FOREIGN PATENT DOCUMENTS

| | | |
|---|---|---|
| CN | 109345608 A | 2/2019 |
| DE | 102015202264 A1 | 8/2016 |
| DE | 102017200282 B3 | 2/2018 |
| DE | 102017223603 A1 | 6/2019 |

OTHER PUBLICATIONS

Abdurahman, Shiras, et al. "Beam hardening correction using cone beam consistency conditions." IEEE transactions on medical imaging 37.10 (2018): 2266-2277.

Aichert, André. Epipolar Consistency in Transmission Imaging. Diss. Friedrich-Alexander-Universitaet Erlangen-Nuernberg (Germany), 2020.

Dissertation "Data-driven beam hardening correction for cone beam computed tomography"; 2021.Text: a href="https://opendata.uni-halle.de/handle/1981185920/41589;" target"_blank"https://opendata.uni-halle.de/handle/1981185920/41589;/a.

Frysch, Robert, and Georg Rose. "Rigid motion compensation in interventional C-arm CT using consistency measure on projection data." International Conference on Medical Image Computing and Computer-Assisted Intervention. Springer, Cham, 2015.

Hoffmann, Mathis, et al. "Empirical scatter correction using the epipolar consistency condition." 5th International Conference on Image Formation in X-Ray Computed Tomography. 2018.193-197.

Klein, Andrew J., et al. "Safety and efficacy of dual-axis rotational coronary angiography vs. standard coronary angiography." Catheterization and Cardiovascular Interventions 77.6 (2011): 820-827.

Rührnschopf and, Ernst-Peter, and Klaus Klingenbeck. "A general framework and review of scatter correction methods in cone beam CT. Part 2: scatter estimation approaches." Medical physics 38.9 (2011): 5186-5199.

Unberath, Mathias, et al. "Consistency-based respiratory motion estimation in rotational angiography." Medical physics 44.9 (2017): e113-e124.

Unberath, Mathias, et al. "Prior-free respiratory motion estimation in rotational angiography." IEEE transactions on medical imaging 37.9 (2018): 1999-2009.

Würfl, Tobias, et al. "Epipolar consistency guided beam hardening reduction-ECC 2." Fully 3D (2017).

Würfl, Tobias, et al. "Physical Constraints for Beam Hardening Reduction using Polynomial Models." Proceedings of the Fifth International Conference on Image Formation in X-Ray Computed Tomography (CT-Meeting). 2018.

* cited by examiner

ARTIFACT AND/OR MOVEMENT CORRECTION IN MEDICAL IMAGES

CROSS REFERENCE TO RELATED APPLICATIONS

This application claims the benefit of DE 10 2022 200 806.5 filed on Jan. 25, 2022, which is hereby incorporated by reference in its entirety.

FIELD

Embodiments relate to a computer-implemented method for providing a result dataset and a medical biplane imaging device.

BACKGROUND

When cone beam computed tomography (CBCT) is applied to an object under examination, movements of the object under examination, for example a head movement, may restrict the quality of an image of acquired sectional views, and/or result in artifacts, for example movement artifacts, which for a diagnostic assessment of the image data, for example of the sectional views, may disconceal relevant areas of the image, for example a view of a hemorrhage. The latest generation of biplane angiography systems are frequently technically capable of mapping the object under examination in two detection planes simultaneously. As a result, an acquisition time for acquiring the projection mappings may be curtailed and the risk of movement reduced.

The printed publication by R. Frysch and G. Rose, "Rigid motion compensation in interventional C-arm CT using consistency measure on projection data.", International Conference on Medical Image Computing and Computer-Assisted Intervention, Springer, Cham, 2015, discloses that movements of the object under examination may for example be compensated for by adjusting geometric parameters of an imaging system to the movement with the help of projection-image-based consistency metrics. The publication further discloses in this respect that although such methods may provide robust and computationally efficient compensation of movements outside the plane of rotation, they are however severely restricted when it comes to compensating for movements within the plane of rotation.

Furthermore, projection mappings acquired by a medical X-ray device frequently exhibit scattered radiation artifacts and/or radiation filtration artifacts. A correction is often time-consuming and/or error-prone since the scattered radiation artifacts and/or radiation filtration artifacts may occur simultaneously with movement artifacts.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an improvement in the way artifacts and/or movements are corrected in medical projection mappings.

A first aspect relates to a computer-implemented method for providing a result dataset. at least one projection mapping pair of an object under examination is acquired using a medical biplane imaging device. The at least one projection mapping pair contains a first and a second projection mapping of the object under examination that map the object under examination simultaneously in a first and a second detection plane. The first and the second detection plane are not arranged in parallel to one another. Further, a correction model for correcting an artifact and/or a movement is determined. The artifact and/or the movement is mapped simultaneously in the at least one first and the at least one second projection mapping. The at least one projection mapping pair specifies a consistency condition for the determination of the correction model. Furthermore, the result dataset is reconstructed at least from the at least one first projection mapping on the basis of the correction model. After this the result dataset is provided.

The object under examination may for example be a human and/or animal patient. The at least one projection mapping pair, for example multiple projection mapping pairs, of the object under examination may be acquired using the medical biplane imaging device. The medical biplane imaging device may have a first and a second imaging unit. The first imaging unit may be configured to acquire the at least one first projection mapping of the at least one projection mapping pair, for example multiple first projection mappings of the multiple projection mapping pairs. For this the first imaging unit may have a first source and a first detector, for example a first flat-panel detector. Furthermore, the second imaging unit may be configured to acquire the at least one second projection mapping of the at least one projection mapping pair, for example multiple second projection mappings of the multiple projection mapping pairs. For this the second imaging unit may have a second source and a second detector, for example a second flat-panel detector. The medical biplane imaging device may be configured to move and/or position the first and the second imaging unit in a coordinated manner, for example in a defined arrangement to one another, and/or independently of one another. The first detection plane may describe a sensor surface, for example a substantially planar sensor surface, of the first detector, the sensor surface being configured to detect radiation and/or waves emitted by the first source following an interaction with the object under examination. The second detection plane may describe a sensor surface, for example a substantially planar sensor surface, of the second detector, the sensor surface being configured to detect radiation and/or waves emitted by the second source following an interaction with the object under examination.

The first and the second projection mapping of the at least one projection mapping pair map an at least partial, for example complete, common field of examination of the object under examination. The first and the second projection mapping of the at least one projection mapping pair may map the object under examination for example two-dimensionally (2D) in a spatially resolved manner. Further, the first and the second projection mapping of the at least one projection mapping pair may map the object under examination, for example the artifact and/or the movement, simultaneously, for example at the same time of acquisition, from two different projection directions, for example projection directions that are non-parallel and non-antiparallel to one another, for example angulations. The at least one first and the at least one second projection mapping may for example include X-ray projection images and/or ultrasound images and/or positron emission tomography images. The projection directions may describe a spatial ray, for example a central ray, between an imaging source, for example an X-ray source and/or an ultrasound transmitter, and a detector.

If multiple projection mapping pairs of the object under examination are acquired, the first and the second detection plane, for example a defined arrangement of the first source and the first detector and a defined arrangement of the second source and the second detector, may be substantially stationary in respect of the object under examination during the acquisition of the projection mapping pairs. Alternatively, the first and the second detection plane, for example the defined arrangement of the first source and the first detector and the defined arrangement of the second source and the second detector, may be moved around the object under examination, for example in a defined arrangement to one another, along a trajectory, for example a circular path, during the acquisition of the multiple projection mapping pairs of the object under examination.

The correction model may include a specification for a transformation, for example a rigid transformation, for example a translation and/or rotation, and/or a correction function, for example a non-linear image value correction, and/or a filtering at least for the at least one first projection mapping. For example, the correction model may contain a specification for the transformation and/or correction function and/or filtering of the at least one first and of the at least one second projection mapping. the correction model may be parameterized. The determination of the correction model may include an adjustment of a generic or initial correction model, for example of at least one parameter of the correction model, to the artifact and/or the movement that is mapped in the at least one projection mapping pair.

The result dataset may be reconstructed at least from the at least one first projection mapping, for example from the multiple first projection mappings, and on the basis of the correction model, the reconstruction of the result dataset may include an application of the, for example rigid, transformation defined by the correction model, and/or the correction function and/or filtering to the at least one first projection mapping, for example to at least some or each of the multiple first projection mappings. The result dataset may map the object under examination in 2D and/or 3D in a spatially resolved manner. Moreover, the result dataset may map the object under examination in a time-resolved manner.

If the first detection plane is arranged so as to be substantially stationary in respect of the object under examination during the acquisition of the multiple projection mapping pairs of the object under examination and if the result dataset is reconstructed only from the multiple first projection mappings, the result dataset may map the object under examination in 2D in a spatially resolved manner. If the first detection plane is moved along a trajectory in respect of the object under examination during the acquisition of the multiple projection mapping pairs of the object under examination and if the result dataset is reconstructed only from the multiple first projection mappings, the result dataset may map the object under examination in 3D in a spatially resolved manner.

The provision of the result dataset may for example include storage on a computer-readable storage medium and/or display on a display unit and/or transfer to a provision unit. For example, a graphic display of the result dataset may be displayed on the display unit.

Embodiments may provide improved artifact and/or movement correction using the consistency condition specified by the at least one projection mapping pair. Thanks to the simultaneous mapping of the object under examination in the two detection planes it is moreover possible to isolate different artifacts to be corrected, for example movement artifacts and/or scattered radiation artifacts and/or radiation filtration artifacts.

In an embodiment of the proposed method for providing a result dataset multiple projection mapping pairs of the object under examination may be acquired that map a movement of the object under examination in a time-resolved manner. Moreover, the artifact may include a movement artifact. The multiple projection mapping pairs may specify the consistency condition for the determination of the correction model along at least one temporal dimension.

The multiple projection mapping pairs may map the object under examination in a time-resolved manner, for example at multiple consecutive acquisition times, in the two detection planes, for example from two different projection directions in each case. The multiple projection mapping pairs, for example the multiple first and second projection mappings, may map the movement of the object under examination, for example a movement of at least one part, for example of a body part and/or an anatomical structure, of the object under examination in a time-resolved manner. The movement, for example the physiological movement, of the object under examination may for example include a respiratory movement, a cardiac movement and/or a head movement of the object under examination. The first and the second projection mapping in each case of a projection mapping pair may simultaneously map a status, for example a movement status, of the object under examination at the respective acquisition time of the projection mapping pair in the two detection planes, for example from the different projection directions.

The multiple projection mapping pairs may map the movement of the object under examination along one temporal dimension in a resolved manner. During a reconstruction of the result dataset at least from the first projection mappings a movement artifact would as a result occur in the result dataset in the absence of a corresponding correction, for example a movement correction. The determination of the correction model may include a modeling, for example a three-dimensionally (3D), spatially and temporally resolved modeling, of the movement of the object under examination mapped in the projection mapping pairs. The determination of the correction model may for example include an identification and/or tracking of geometric and/or anatomical features of the object under examination that are mapped in the first and second projection mappings of the projection mapping pairs.

During the determination of the correction model of the movement of the object under examination mapped in the projection mapping pairs the projection mapping pairs may specify a consistency condition for the determination of the correction model at least along the temporal dimension. a consistency, for example a paired consistency, of the status of the object under examination mapped in the first and second projection mappings in each case of a projection mapping pair, for example a consistency of a mapped status of the movement of the object under examination, may be assumed. The consistency condition may for example be specified as a consistency in each case of one of the projection mapping pairs with all other projection mapping pairs, for example along the temporal dimension. The second projection mappings of the projection mapping pairs may specify depth information on the movement of the object under examination mapped in the first projection mappings for the determination of the correction model. The correction model may be determined such that the movement of the object under examination modeled in the correction model satisfies the consistency condition specified by the projection mapping pairs at least along the temporal dimension, at the multiple acquisition times of the projection mapping pairs.

As a result, a movement-corrected reconstruction of the result dataset may be provided, for example even in the case of movements of the object under examination in parallel to the first detection plane.

In an embodiment of the proposed method for providing a result dataset a physiological movement signal may be received which maps the movement of the object under examination, the determination of the correction model may additionally be based on the physiological movement signal.

The receipt of the movement signal may for example include detecting and/or reading a computer-readable data store and/or receipt from a data storage unit, for example a database. Further, the movement signal may be provided by a provision unit of a physiological sensor, for example an electrocardiograma/or a respiratory sensor and/or a pulse sensor and/or a movement sensor, and/or of a sensor for detecting a positioning of the object under examination, for example an electromagnetic and/or optical and/or acoustic and/or mechanical sensor.

The correction model may additionally be determined using the physiological movement signal. As a result, a more robust and more precise reconstruction of the result dataset may be enabled. In an embodiment of the proposed method for providing a result dataset the medical biplane imaging device may be configured as a medical biplane X-ray device.

The first source may be a first X-ray source, the second source a second X-ray source, the first detector a first X-ray detector, for example a first X-ray flat-panel detector, and the second detector a second X-ray detector, for example a second X-ray flat-panel detector.

The first and the second X-ray source may, to acquire the at least one projection mapping pair, for example the at least one first and the at least one second projection mapping, in each case emit an X-ray beam, for example in the form of a cone beam and/or fan beam and/or parallel beam, to highlight the object under examination, for example the first and the second X-ray detector. the first and the second X-ray source may emit the respective X-ray beam containing an identical or different X-ray dose. The first X-ray detector may detect the X-ray beam emitted by the first X-ray source following an interaction with the object under examination and provide the first projection mapping. Further, the second X-ray detector may detect the X-ray beam emitted by the second X-ray source following an interaction with the object under examination and provide the second projection mapping.

As a result, a time-efficient and at the same time high-resolution mapping of the object under examination may be enabled in the at least one projection mapping pair.

In an embodiment of the proposed method for providing a result dataset the at least one first projection mapping may be acquired using a higher X-ray dose compared to the at least one second projection mapping.

A signal-to-noise ratio and/or a contrast-to-noise ratio of the at least one first and the at least one second projection mapping is dependent on the X-ray dose during the acquisition of the at least one first and the at least one second projection mapping. A higher X-ray dose frequently results in a higher signal-to-noise ratio and/or contrast-to-noise ratio. However, a higher X-ray dose during the acquisition of the at least one first and the at least one second projection mapping may adversely increase the exposure to radiation of the object under examination.

The at least one first projection mapping, for example the multiple first projection mappings, may be acquired with a first X-ray dose and the at least one second projection mapping, for example the multiple second projection mappings, may be acquired with a second X-ray dose, the first X-ray dose being higher than the second X-ray dose. As a result, it is possible for the at least one first projection mapping to have an optimum signal-to-noise ratio and/or contrast-to-noise ratio, for example sufficient for a diagnostic assessment. Further, the second X-ray dose may be minimized to the extent that the at least one second projection mapping maps geometric and/or anatomical features of the object under examination for the determination of the correction model sufficiently but has a signal-to-noise ratio and/or contrast-to-noise ratio that is not sufficient for a diagnostic assessment. This may for example be advantageous if the result dataset is reconstructed only from the at least one first projection mapping and on the basis of the correction model.

As a result, the exposure to radiation of the object under examination during the acquisition of the projection mapping pairs may be minimized.

In an embodiment of the proposed method for providing a result dataset the artifact may include a scattered radiation artifact and/or a radiation filtration artifact. The at least one first and the at least one second projection mapping of the at least one projection mapping pair may specify the consistency condition for the paired determination of the correction model.

The first and second projection mapping in each case of a projection mapping pair may map the scattered radiation artifact and/or the radiation filtration artifact simultaneously in the first and the second detection plane.

The scattered radiation artifact may for example be configured as annular and/or in strip form in the at least one first and the at least one second projection mapping. The correction model may include a specification for filtering, for example a filter core, of the at least one first and the at least one second projection mapping. The determination of the correction model may include an adaptation of at least one parameter of the specification for filtering, for example of the filter core.

The radiation filtration artifact may be mapped as a deviation from a pure line integral in the image values of the at least one first and the at least one second projection mapping. The correction model may include a correction function, for example a polynomial correction function, for the non-linear image value correction of image values of the at least one first and the at least one second projection mapping.

The adaptation, for example optimization, of the at least one parameter of the specification for filtering and/or of the correction function may take place iteratively, for example in accordance with a Nelder-Mead simplex method. By applying the most recently determined specification for filtering and/or the correction function to the at least one first and the at least one second projection mapping at least one corrected first and at least one corrected second projection mapping may be provided. For the correction of the radiation filtration artifacts the correction function, for example the polynomial correction function, with the most recently adapted at least one parameter, for example a most recently adapted at least one coefficient, may be applied to the image values of the at least one first and the at least one second projection mapping. For the correction of the scattered radiation artifacts the specification for filtering, for example the filter core, for example a Gauss core, with the most recently adapted at least one parameter, for example a variance and/or height of the filter core, may be applied to the at least one first and the at least one second projection mapping.

The at least one first and the at least one second projection mapping, for example the first and the second projection mapping of one of the multiple projection mapping pairs, may specify the consistency condition for the determination of the correction model, for example for the adaptation of the at least one parameter of the specification for the filtering and/or the correction function, in pairs, for example as an epipolar consistency condition. Thanks to the simultaneous mapping of the object under examination in the first and the second detection plane in the at least one first and the at least one second projection mapping, the scattered radiation artifact and/or the radiation filtration artifact may be isolated from a possible movement artifact.

The at least one parameter of the correction model may be adapted on the basis of the paired consistency condition, for example the epipolar consistency condition, between the at least one corrected first projection mapping and the at least one corrected second projection mapping. The paired consistency may be quantified by a consistency metric, for example an epipolar consistency metric. By adapting, for example optimizing, the at least one parameter of the correction model an epipolar inconsistency between the at least one corrected first projection mapping and the at least one corrected second projection mapping may be minimized. As a result, an improved artifact correction may be enabled.

In an embodiment of the proposed method for providing a result dataset the result dataset may additionally be reconstructed from the at least one second projection mapping.

The result dataset may be reconstructed from the at least one first and the at least one second projection mapping, for example from the multiple first and the multiple second projection mappings, and on the basis of the correction model. As a result, the result dataset may map the object under examination in 3D in a spatially resolved manner. The reconstruction of the result dataset may for example include a filtered backprojection. Moreover, the reconstruction of the result dataset may include an application of a transformation, for example a rigid transformation, for example a translation and/or rotation, to the at least one first projection mapping, for example the multiple first projection mappings, and/or the at least one second projection mapping, for example the multiple second projection mappings. The transformation may be determined using the correction model.

The embodiment may provide a 3D spatially resolved reconstruction of the result dataset while simultaneously reducing the time taken for acquisition.

In an embodiment of the proposed method for providing a result dataset multiple projection mapping pairs of the object under examination may be acquired around a common axis of rotation.

The multiple first projection mappings may be acquired around a first isocenter and the multiple second production mappings around a second isocenter. The first isocenter may be a first center of rotation, around which the first imaging unit, for example the first source and the first detector, is moved, for example rotated, during the acquisition of the first projection mappings. Further, the second isocenter may be a second center of rotation, around which the second imaging unit, for example the second source and the second detector, is moved, for example rotated, during the acquisition of the second projection mappings. the first and the second isocenter may be arranged on the common axis of rotation. A spatial distance between the first source and the first detector may in each case be constant in respect of the first isocenter during the acquisition of the first projection mappings of the object under examination. Moreover, a spatial distance between the second source and the second detector may in each case be constant in respect of the second isocenter during the acquisition of the second projection mappings of the object under examination. The first and/or the second isocenter may be arranged in the object under examination.

The embodiment may provide an improved, for example more consistent, determination of the correction model and an improved reconstructability of the result dataset.

In an embodiment of the proposed method for providing a result dataset multiple projection mapping pairs of the object under examination may be acquired. the first and the second detection planes in each case of a projection mapping pair may have a constant angle to one another.

The first imaging unit, for example the first source and the first detector, and the second imaging unit, for example the second source and the second detector, may have a constant spatial arrangement to one another during the acquisition of the multiple projection mapping pairs. Moreover, the first imaging unit and the second imaging unit may always have a defined spatial arrangement to one another during the acquisition of the multiple projection mapping pairs.

As a result, the consistency condition for the determination of the correction model may be specified at the various acquisition times of the multiple projection mapping pairs with an identical relative acquisition geometry of the first and second detection plane to one another, for example along the temporal dimension.

In an embodiment of the proposed method for providing a result dataset the first and second detection planes in each case of a projection mapping pair may have an angle of between 50° and 130°, for example 90°, to one another.

As a result, it may be ensured that the artifact and/or the movement of the object under examination, for example a movement of the object under examination running in parallel to one of the detection planes, may be reliably and simultaneously mapped in the other detection plane in each case. As a result, the consistency condition for the determination of the correction model may be reliably specified.

In an embodiment of the proposed method multiple projection mapping pairs of the object under examination may be acquired around a common isocenter.

A spatial distance between the first source, the first detector, the second source and the second detector in each case in respect of the common isocenter may be constant during the acquisition of the multiple projection mapping pairs. The common isocenter may be a common center of rotation, around which the first imaging unit, for example the first source and the first detector, and the second imaging unit, for example the second source and the second detector, may be moved, for example rotated, during the acquisition of the first projection mappings. the first and the second imaging unit may have the common axis of rotation or different axes of rotation. The common isocenter may be arranged on the common axis of rotation or at the point of intersection of the different axes of rotation.

The common isocenter may be stationary or be repositioned during the acquisition of the multiple projection mapping pairs. For example, the common isocenter may be moved along a predetermined trajectory during the acquisition of the projection mapping pairs, for example between the acquisition times of the projection mapping pairs. The predetermined trajectory may run at least partially, for example completely, within the object under examination.

The embodiment may provide an improved, for example more consistent, determination of the correction model and an improved reconstructability of the result dataset.

In an embodiment of the proposed method for providing a result dataset multiple projection mapping pairs of the object under examination may be acquired. the first projection mappings may be acquired around a first isocenter and the second production mappings around a second isocenter. the first and the second isocenter may be different.

The first and the second isocenter may be constantly or variably spatially distanced from one another during the acquisition of the multiple projection mapping pairs. Thus, the first and the second imaging unit may in each case be moved, for example rotated, around an isocenter, for example the first and the second isocenter, during the acquisition of the projection mapping pairs. Thanks to the different isocenters a more flexible mapping of the object under examination, for example of the movement and/or of the artifact, in the projection mapping pairs may be enabled.

In an embodiment of the proposed method for providing a result dataset the determination of the correction model may include an optimization of a consistency metric.

The consistency metric may evaluate a consistency, for example a conformity, between the artifact and/or movement modeled by the correction model, and the artifact and/or movement mapped in the at least one projection mapping pair, for example simultaneously in the at least one first and the at least one second projection mapping. For example, the consistency metric may quantify a deviation between the artifact and/or movement modeled by the correction model, and the artifact and/or movement mapped in the at least one projection mapping pair. For example, the consistency metric may measure an epipolar inconsistency of the first and second projection mappings in each case of a projection mapping pair to all other projection mapping pairs, for example along the temporal dimension. The correction model may be determined by optimizing the consistency metric, for example by minimizing the inconsistency, of the projection mapping pairs in each case in respect of all other projection mapping pairs, for example in each case along the temporal dimension. This may for example be advantageous for a movement correction.

The optimization of the consistency metric may include a determination, for example a generation, of a first and a second virtual, for example corrected, projection mapping to the at least one projection mapping pair, for example in each case a first and a second virtual projection mapping to the multiple projection mapping pairs, on the basis of the correction model. The correction model may for example include a volume model, for example a deformable 3D spatially resolved volume model, of at least of part of the object under examination, for example a volume network model. The at least one first and the at least one second virtual projection mapping may be determined by a virtual projection of the correction model, for example of the volume model, in a virtual first and a virtual second detection plane. The virtual projection in the virtual first and the virtual second detection plane may be determined using an acquisition geometry for the acquisition of the at least one first and the at least one second projection mapping that map the object under examination in the first and the second detection plane. This may for example be advantageous for the correction of a movement mapped in the multiple projection mapping pairs. For the correction of the radiation filtration artifact and/or of the scattered radiation artifact the correction model may model an anatomical structure, for example a bone structure, of the object under examination, which may be mapped by the virtual projection in the virtual first and the virtual second detection plane. As a result, an improved, for example dedicated, correction of the artifacts generated by the anatomical structure, for example by a further correction polynomial in the correction function for the image value correction, may be enabled.

Alternatively, or additionally by applying the correction model, for example the specification for the filtering and/or the correction function to the at least one first and the at least one second projection mapping the at least one virtual, for example corrected, first and at least one virtual, for example corrected, second projection mapping may be provided.

The consistency metric may evaluate both the conformity between the at least one first projection mapping and the at least one first virtual projection mapping and between the at least one second projection mapping and the at least one second virtual projection mapping. For example, the consistency metric may be determined as the sum of two individual metrics, the individual metrics in each case evaluating the conformity between the at least one first projection mapping and the at least one first virtual projection mapping and the conformity between the at least one second projection mapping and the at least one second virtual projection mapping. The consistency metric may be optimized, such that both the individual metrics are optimized. As a result, the consistency condition specified by the at least one first and the at least one second projection mapping in each case of a projection mapping pair may be satisfied.

Alternatively, or additionally the consistency metric may evaluate a paired consistency, for example an epipolar consistency, between the mapping of the artifact and/or of the movement in the at least one virtual, for example corrected, first projection mapping and the at least one virtual, for example corrected, second projection mapping in each case of a projection mapping pair.

The optimization of the consistency metric may for example include a minimization, for example an iterative minimization, of a cost function. The proposed form of embodiment may provide a particularly precise determination of the correction model.

In an embodiment of the proposed method at least one further projection mapping may be acquired for the at least one projection mapping pair by a further imaging unit and maps the object under examination simultaneously in a further detection plane. the further detection plane may be arranged non-parallel to the first and second detection plane. Moreover, the consistency condition for the determination of the correction model may additionally be specified using the at least one further projection mapping. Alternatively, or additionally the result dataset may additionally be reconstructed from the at least one further projection mapping.

The further imaging unit may have all the features and properties that are described in respect of the first and/or the second imaging unit and vice versa. For example, the further imaging unit may include a further source and a further detector. The further imaging unit may be arranged on the biplane imaging device, for example movably attached, or may be spaced apart from the biplane imaging device, for example independently movably. The at least one further projection mapping may have all the features and properties that were described in respect of the at least one first and/or the at least one second projection mapping and vice versa. The at least one further projection mapping may map the object under examination in the further detection plane simultaneously to the at least one first and the at least one second projection mapping of the respective projection mapping pair. For example, for the multiple first and the multiple second projection mappings in each case a further projection mapping may be acquired that simultaneously maps the object under examination, for example the artifact and/or the movement, in the further detection plane. The further detection plane is arranged neither parallel to the first detection plane nor parallel to the second detection plane.

Thanks to the additional mapping of the object under examination in the further detection plane the at least one projection mapping pair may be expanded to form a projection mapping triple. As a result a robustness of the consistency condition specified by the at least one projection mapping pair for the determination of the correction model may be increased.

The result dataset may be reconstructed from the at least one first projection mapping, the at least one further projection mapping and on the basis of the correction model. For example, the result dataset may be reconstructed from the at least one first, the at least one second and the at least one further projection mapping and on the basis of the correction model.

A second aspect relates to a medical biplane imaging device, which is configured to execute a proposed method for providing a result dataset.

The advantages of the proposed biplane imaging device correspond substantially to the advantages of the proposed method for providing a result dataset. Features, advantages, or alternative forms of embodiment mentioned here may likewise also be transferred to the other claimed subject matters and vice versa.

The medical biplane imaging device may include a first and a second imaging unit. The first imaging unit may include a first source and a first detector. Further, the second imaging unit may include a second source and a second detector. The first imaging unit may be configured to acquire the at least one first projection mapping of the object under examination. Further, the second imaging unit may be configured to acquire the at least one second projection mapping of the object under examination. The first and the second imaging unit may be movable, for example rotatable, for example robotically and/or in a defined arrangement to one another, in respect of the object under examination. The medical biplane imaging device may further include a display unit, for example a screen and/or monitor, that is configured to display a graphical display of the result dataset.

The medical biplane imaging device may include a first and a second C-arm, that may be moved in a coordinated manner and/or independently of one another. The first source and the first detector may be arranged on the first C-arm, for example in a defined arrangement to one another. Further, the second source and the second detector may be arranged on the second C-arm, for example in a defined arrangement to one another. The medical biplane imaging device may further be configured to move, for example rotate, the first C-arm around a first isocenter and the second C-arm around a second isocenter. the first and the second isocenter may be identical or different.

In an embodiment of the proposed medical biplane imaging device the biplane imaging device may include a first and a second X-ray unit. The first X-ray unit may include a first X-ray source and a first X-ray detector. the first X-ray unit may be configured to acquire the at least one first projection mapping of the object under examination. The second X-ray unit may include a second X-ray source and a second X-ray detector. the second X-ray unit may be configured to acquire the at least one second projection mapping of the object under examination.

A third aspect relates to a computer program product with a computer program that may be loaded directly into a memory of a provision unit, including program sections in order to execute all the steps of the method for providing a result dataset if the program sections are executed by the provision unit.

Embodiments further include a computer-readable storage medium, on which are stored program sections that may be read and executed by a provision unit, in order to execute all the steps of the method for providing a result dataset, if the program sections are executed by the provision unit.

A software-based implementation has the advantage that even provision units that were used previously may easily be retrofitted with a software update in order to work in the described manner. Such a computer program product may if appropriate include, as well as the computer program, additional elements such as for example documentation and/or additional components, as well as hardware components, such as for example hardware keys (dongles, etc.) for the use of the software.

DETAILED DESCRIPTION

Figure 1:
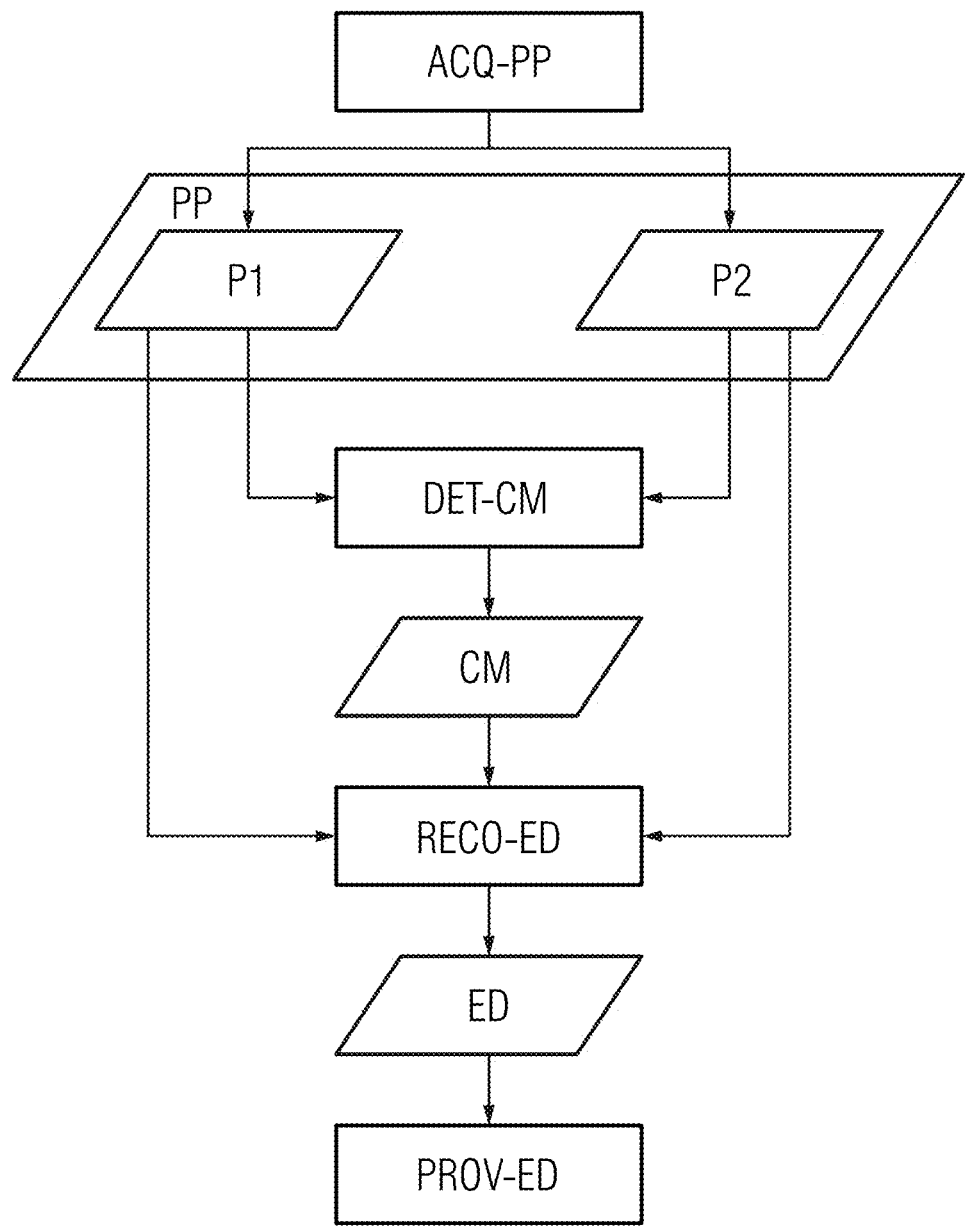
FIGS. 1, 2, and 3 depict schematic representations of different embodiments of a method for providing a result dataset.

FIG. 1 schematically depicts an embodiment of a method for the provision PROV-ED of a result dataset ED. At least one projection mapping pair PP of an object under examination may be acquired ACQ-PP by a medical biplane imaging device. The at least one projection mapping pair PP may have a first PP1 and a second projection mapping PP2 of the object under examination, that maps the object under examination simultaneously in a first and a second detection plane. the first and the second detection plane are arranged non-parallel to one another. Furthermore, a correction model CM may be determined DET-CM for the correction of an artifact and/or a movement simultaneously mapped in the at least one first PP1 and the at least one second projection mapping PP2. the at least one projection mapping pair PP may specify a consistency condition for the determination DET-CM of the correction model CM. Further, the result dataset ED may be reconstructed RECO-ED at least from the at least one first projection mapping PP1 and on the basis of the correction model CM. The result dataset ED may then be provided PROV-ED.

The medical biplane imaging device may be configured as a medical biplane X-ray device. Moreover, the artifact may include a scattered radiation artifact and/or a radiation filtration artifact. the at least one first PP1 and the at least one second projection mapping PP2 of the at least one projection mapping pair PP may specify a consistency condition for the paired determination DET-CM of the correction model CM.

The determination DET-CM of the correction model CM may include an optimization of a consistency metric. The result dataset ED may additionally be reconstructed RECO-ED from the at least one second projection mapping PP2.

Multiple projection mapping pairs PP of the object under examination may be acquired ACQ-PP around a common axis of rotation, for example a common isocenter. Moreover, the first and the second detection planes in each case of a projection mapping pair may have a constant angle, for example of between 50° and 130°, for example 90°, to one another. For example, the multiple projection mapping pairs PP, for example the first PP1 and second projection mappings PP2, may be acquired along equidistant projection directions within a specified projection angular range. For a total of N first PP1 and second projection mappings PP2, N/2 projection mapping pairs may be formed. The $i^{th}$ of the N/2 projection mapping pairs may include the projection mapping with index i as the first projection mapping and the projection mapping with the index i+N/2 as the second projection mapping. the first and second detection planes of the N/2 projection mapping pairs may have a constant angle to one another, which corresponds to half the projection angular range.

Figure 2:
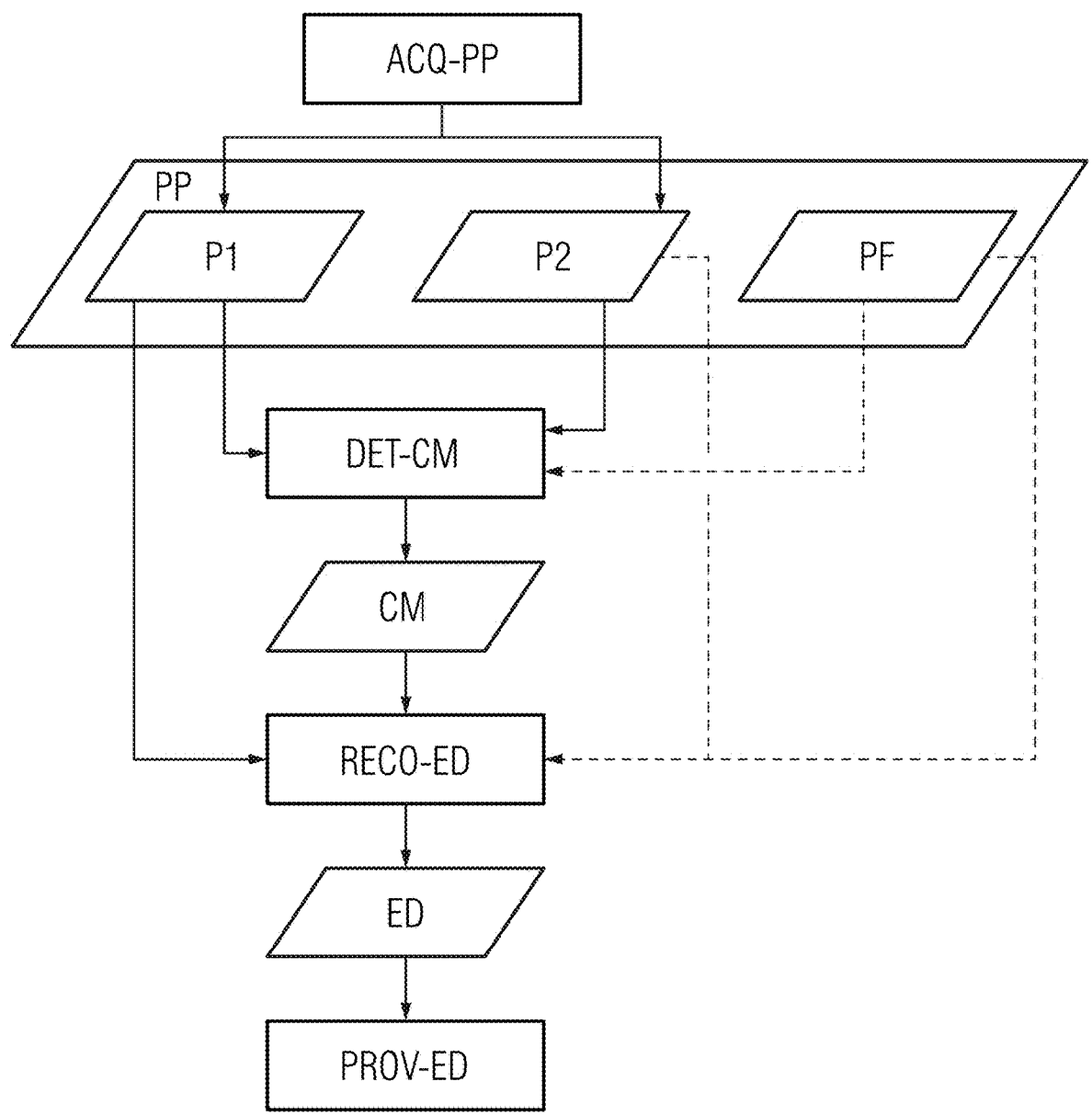

FIG. 2 depicts a schematic representation of an embodiment of a proposed method for the provision PROV-ED of a result dataset ED. at least one further projection mapping PF which maps the object under examination simultaneously in a further detection plane may be acquired for the at least one projection mapping pair PP by a further imaging unit. the further detection plane is arranged non-parallel to the first and second detection plane. The consistency condition for the determination DET-CM of the correction model CM may additionally be specified using the at least one further projection mapping PF. Alternatively or additionally the result dataset ED may additionally be reconstructed RECO-ED from the at least one further projection mapping PF.

Figure 3:
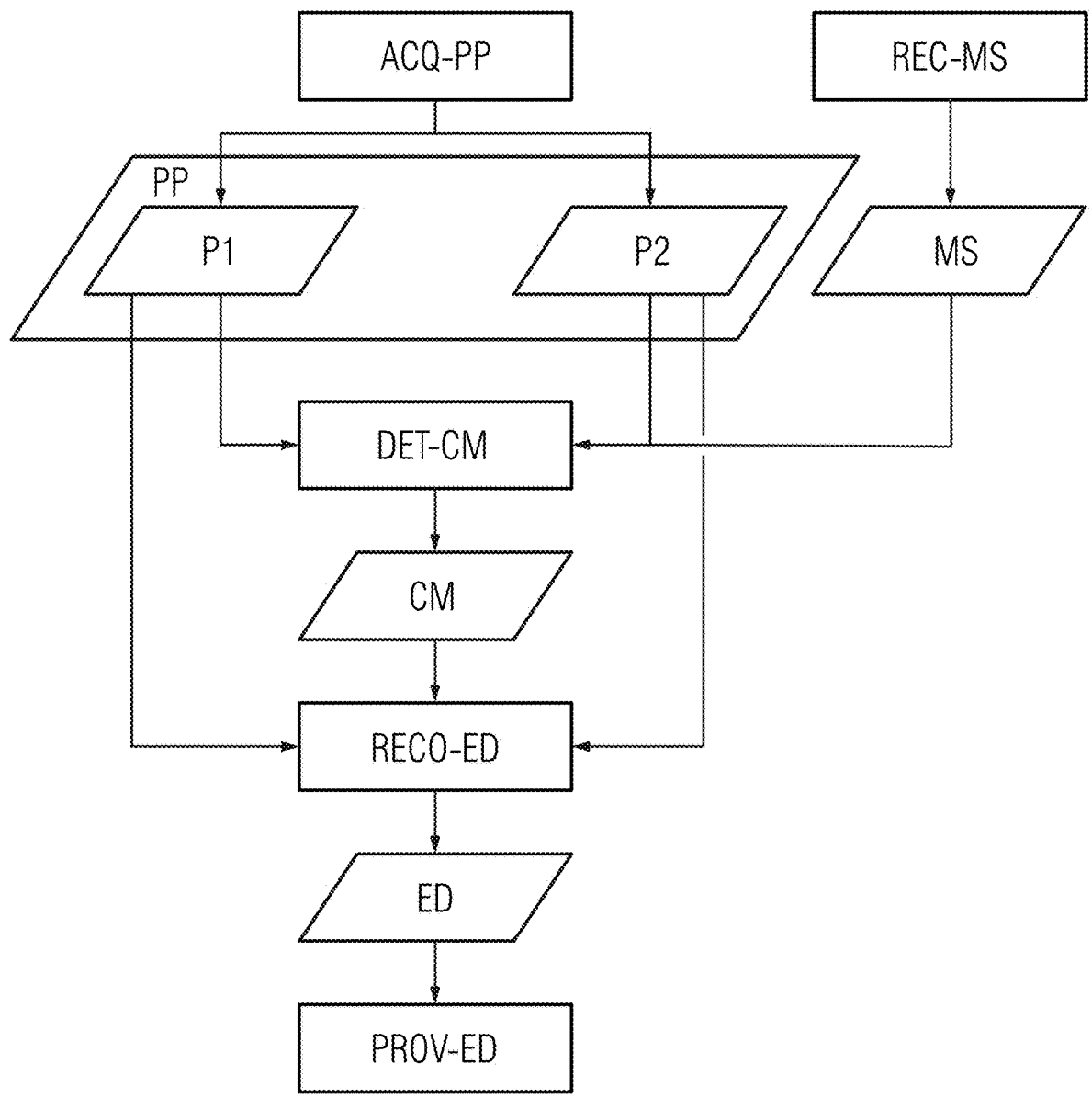

FIG. 3 schematically depicts an embodiment of a proposed method for the provision PROV-ED of a result dataset ED. multiple projection mapping pairs PP of the object under examination may be acquired ACQ-PP, which map a movement of the object under examination in a time-resolved manner, the multiple projection mapping pairs PP may specify the consistency condition for the determination DET-CM of the correction model CM along at least one temporal dimension. Moreover, a physiological movement signal MS may be received RECO-MS, which maps the movement of the object under examination. The determination DET-CM of the correction model CM may additionally be based on the physiological movement signal MS.

The first projection mappings PP1 may be acquired ACQ-PP around a first isocenter and the second projection mappings PP2 around a second isocenter. the first and the second isocenter may be different.

Figure 4:
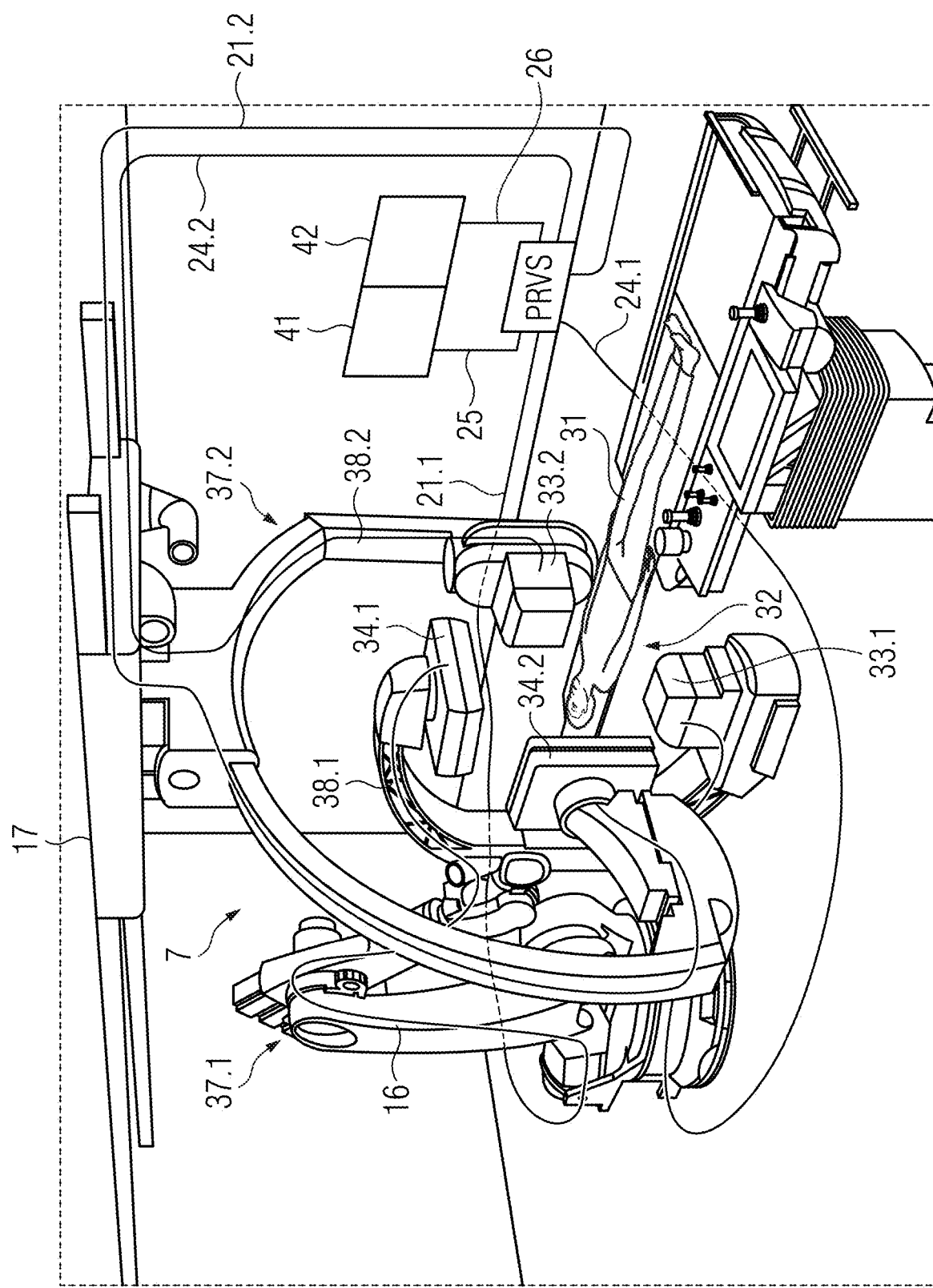
FIG. 4 depicts a schematic representation of a medical biplane X-ray device according to an embodiment.

FIG. 4 depicts a schematic representation of a medical biplane X-ray device, for example for a proposed medical biplane imaging device. The biplane X-ray device 7 includes a first X-ray unit 37.1 and a second X-ray unit 37.2. The first X-ray unit 37.1 for example includes a 6-axis articulated robot 16, to which a C-arm 38.1 is attached, which supports a first X-ray source 33.1 and a first X-ray detector 34.1. In the embodiment shown the second X-ray unit 37.2 includes a stand 17 that may be moved on rails, which supports a mobile C-arm 38.2, to which a second X-ray source 33.2 and a second X-ray detector 34.2 are attached.

The medical biplane X-ray device 7 may further include a provision unit PRVS. The medical biplane X-ray device 7 is configured to execute a form of embodiment of the proposed method for the provision PROV-ED of a result dataset ED.

For the acquisition ACQ-PP of the at least one projection mapping pair PP, for example the at least one first PP1 and the at least one second projection mapping PP2, the C-arm 38.1 of the first X-ray unit 37.1 and the C-arm 38.2 of the second X-ray unit 37.2 may be movably mounted around one or more axes. For the acquisition of the at least one projection mapping pair PP from the object under examination 31 arranged on a patient positioning facility 32, the provision unit PRVS may send a signal 24.1 and 24.2 to the first 33.1 and the second X-ray source 33.2. The first X-ray source 33.1 may then emit a first X-ray beam, for example a cone beam and/or fan beam and/or parallel beam. When, after an interaction with the object under examination 31, the first X-ray beam encounters a surface of the first X-ray detector 34.1, the first X-ray detector 34.1 may provide a signal 21.1 to the provision unit PRVS. Similarly, the second X-ray source 33.2 may emit a second X-ray beam. When, after an interaction with the object under examination 31, the second X-ray beam encounters a surface of the second X-ray detector 34.2, the second X-ray detector 34.2 may send a second signal 21.2 to the provision unit PRVS. The provision unit PRVS may for example, using the signal 21.1 and the second signal 21.2, receive the at least one projection mapping pair PP, for example the at least one first PP1 and the at least one second projection mapping PP2.

The biplane X-ray device 7, for example the angled arrangement of the first 37.1 and the second X-ray unit 37.2 to one another, enables an acquisition, for example a simultaneous acquisition, of the at least one first PP1 and the at least one second projection mapping PP2 from different projection directions, for example a simultaneous mapping of the object under examination 31 in the first and second detection plane.

Furthermore, the medical biplane X-ray device 7 may include an input unit 42, for example a keyboard, and/or a display unit 41, for example a monitor and/or a display. The input unit 42 may preferably be integrated into the display unit 41, for example in the case of a capacitive and/or resistive input display. control of the medical biplane X-ray device 7, for example of the method for the provision PROV-ED of a result dataset ED, may be enabled by an input by a user, for example a medical operative, at the input unit 42.

Further, the display unit 41 may be configured to display information and/or graphical displays of information on the medical biplane X-ray device 7 and/or the provision unit PRVS and/or further components. For this the provision unit PRVS may for example send a signal 25 to a display unit 41. For example the display unit 41 may be configured to display a graphical display of the result dataset ED.

To reduce a radiation dose during the acquisition ACQ-PP of the at least one projection mapping pair PP of the object under examination 31, the at least one first projection mapping PP1 may be acquired with a higher X-ray dose compared to the at least one second projection mapping PP2. The X-ray dose for the acquisition of the at least one second projection mapping PP2 may be less than an X-ray dose required for a diagnostic assessment.

The schematic representations contained in the figures described do not at all map scale or proportions.

In conclusion it is once again noted that the methods and apparatuses described in detail above relate solely to exemplary embodiments that may be modified by the person skilled in the art in a variety of ways, without departing from the scope of the invention. Further, the use of the indefinite article "a" or "an" does not rule out that the features in question may also be present multiple times. Likewise, the terms "unit" and "element" do not rule out that the components in question consist of multiple interacting subcomponents that if appropriate may also be distributed spatially.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for provision of a result dataset, the method comprising:
   acquiring multiple projection mapping pairs of an object under examination by a medical biplane imaging device in a time-resolved manner, wherein at least one projection mapping pair of the multiple projection mapping pairs contains a first projection mapping and a second projection mapping of the object under examination that map the object under examination simultaneously in a first detection plane and a second detection plane, wherein the first detection plane and the second detection plane are arranged non-parallel to one another;
   determining a correction model for correction of an artifact, a movement, or the artifact and the movement, wherein the artifact, the movement, or the artifact and the movement is mapped simultaneously in the first projection mapping and the second projection mapping, wherein the multiple projection mapping pairs specify a consistency condition for the determination of the correction model along at least a temporal dimension;
   reconstructing the result dataset at least from the first projection mapping and on a basis of the correction model; and
   providing the result dataset.

2. The method of claim 1, further comprising:
   receiving a physiological movement signal that maps the movement of the object under examination, wherein the determination of the correction model is additionally based on the physiological movement signal.

3. The method of claim 1, wherein the medical biplane imaging device is configured as a medical biplane X-ray device.

4. The method of claim 3, wherein the first projection mapping is acquired with a higher X-ray dose compared to the second projection mapping.

5. The method of claim 1, wherein the artifact comprises a scattered radiation artifact, a beam hardening artifact, or the scatter radiation artifact and the beam hardening artifact, wherein the first projection mapping and the second projection mapping of the at least one projection mapping pair specifies pairwise the consistency condition for the determination of the correction model.

6. The method of claim 1, wherein the result dataset is additionally reconstructed from the second projection mapping.

7. The method of claim 1, wherein the multiple projection mapping pairs of the object under examination are acquired around a common axis of rotation.

8. The method of claim 1, wherein the first detection plane and the second detection plane of a projection mapping pair of the multiple projection mapping pairs include a constant angle to one another.

9. The method of claim 8, wherein the first detection plane and the second detection planes of a projection mapping pair include an angle of between 50° and 130° to one another.

10. The method of claim 1, wherein the multiple projection mapping pairs of the object under examination are acquired around a common isocenter.

11. The method of claim 1, wherein wherein the first projection mappings of the multiple projection mapping pairs are acquired around a first isocenter and the second projection mappings around a second isocenter, wherein the first isocenter and the second isocenters are different.

12. The method of claim 1, wherein the determination of the correction model comprises an optimization of a consistency metric.

13. The method of claim 1, wherein at least one further projection mapping is acquired for the multiple mapping pairs with a further imaging unit, which maps the object under examination simultaneously in a further detection plane, wherein the further detection plane is arranged non-parallel to the first detection plane and the second detection plane, wherein the consistency condition for the determination of the correction model is additionally specified using the at least one further projection mapping and the result dataset is additionally reconstructed from the at least one further projection mapping.

14. A medical biplane imaging device comprising:
   a first X-ray unit comprising a first X-ray source and a first X-ray detector; wherein the first X-ray unit is configured for an acquisition of multiple first projection mappings of an object under examination;
   a second X-ray unit comprising a second X-ray source and a second X-ray detector, wherein the second X-ray unit is configured for an acquisition of multiple second projection mappings of the object under examination, wherein each multiple mapping pair of a plurality of multiple mapping pairs comprises a first projection mapping and a second projection mapping respectively of the multiple first projection mappings and multiple second projection mappings that are acquired in a time-resolved manner, wherein the first projection mappings and the second projection mappings of the object under examination map the object under examination simultaneously in a first detection plane and a second detection plane, wherein the first detection plane and the second detection plane are arranged non-parallel to one another; and
   a processing unit configured to:
      determine a correction model for correction of an artifact, a movement, or the artifact and the movement, wherein the artifact, the movement, or the artifact and the movement is mapped simultaneously in the multiple first projection mappings and the multiple second projection mappings, wherein the multiple first projection mappings and the multiple second projection mappings specify a consistency condition for the determination of the correction model along at least a temporal dimension;

reconstruct a result dataset at least from the multiple first projection mappings and on a basis of the correction model; and provide the result dataset.

15. A non-transitory computer readable storage medium comprising a set of computer-readable instructions stored thereon for provision of a result dataset, the instructions which, when executed by at least one processor cause the processor to:

acquire multiple projection mapping pairs of an object under examination by a medical biplane imaging device in a time-resolved manner, wherein at least one projection mapping pair of the multiple projection mapping pairs contains a first projection mapping and a second projection mapping of the object under examination that map the object under examination simultaneously in a first detection plane and a second detection plane, wherein the first detection plane and the second detection plane are arranged non-parallel to one another;

determine a correction model for correction of an artifact, a movement, or the artifact and the movement, wherein the artifact, the movement, or the artifact and the movement is mapped simultaneously in the first projection mapping and the second projection mapping, wherein the multiple projection mapping pairs specify a consistency condition for the determination of the correction model along at least a temporal dimension;

reconstruct the result dataset at least from the first projection mapping and on a basis of the correction model; and provide the result dataset.

* * * * *